United States Patent [19]
Stelter et al.

[11] Patent Number: 5,659,855
[45] Date of Patent: Aug. 19, 1997

[54] ELECTROPHOTOGRAPHIC IMAGE MEMBER WITH MAGNETIC PROPERTY AND IMAGE FORMING APPARATUS

[75] Inventors: Eric C. Stelter, Rochester; Joseph A. Pavlisko, Pittsford, both of N.Y.

[73] Assignee: Eastman Kodak Company, Rochester, N.Y.

[21] Appl. No.: 322,242

[22] Filed: Oct. 12, 1994

[51] Int. Cl.⁶ .............. G03G 21/00; G03G 5/00; G03G 15/01
[52] U.S. Cl. .............. 399/205; 347/116; 399/31; 399/162; 399/178
[58] Field of Search .............. 355/211, 212, 355/326 R, 208; 347/116, 232, 234, 154, 153; 360/70, 72.2; 226/28, 45; 399/116, 178, 162, 205, 220, 31

[56] References Cited

U.S. PATENT DOCUMENTS

| | | | |
|---|---|---|---|
| 2,674,009 | 4/1954 | Williams | 156/252 |
| 4,367,944 | 1/1983 | Kuru | 355/211 X |
| 4,556,311 | 12/1985 | Tagoku | 355/212 |
| 4,829,326 | 5/1989 | Emmett et al. | 347/116 |
| 4,912,491 | 3/1990 | Hoshino et al. | 347/116 |
| 4,937,664 | 6/1990 | Chiku et al. | 358/327 X |
| 4,987,431 | 1/1991 | Harvey | 354/21 |
| 5,025,269 | 6/1991 | Saeki et al. | 347/116 |
| 5,040,003 | 8/1991 | Willis | 347/118 |
| 5,121,145 | 6/1992 | Buch et al. | 347/118 |
| 5,200,285 | 4/1993 | Carrish | 430/45 |
| 5,313,254 | 5/1994 | Temple | 355/212 X |

FOREIGN PATENT DOCUMENTS

| | | | |
|---|---|---|---|
| 61-90171 | 5/1986 | Japan | 355/212 A |
| 3-269453 | 12/1991 | Japan | 355/212 A |

*Primary Examiner*—Shuk Lee
*Attorney, Agent, or Firm*—Norman Rushefsky

[57] ABSTRACT

An image forming apparatus uses an endless belt image member having a magnetic strip along one or more edges. A linear printhead is flashed in response to a magnetic encoder signal in the magnetic strip. Preferably, the apparatus has first and second linear writers and the magnetic encoding signal is created in the magnetic strip in conjunction with creation of a writing signal for the first writer with the second writer using the magnetic encoding signal to register its writing with the first writing. Preferably, an auxiliary signal is placed in the strip indicative of variable characteristics of either the image member or the image forming apparatus. This in turn is read by the apparatus and a charging, exposing or toning station controlled in response to the auxiliary signal.

17 Claims, 2 Drawing Sheets

ELECTROPHOTOGRAPHIC IMAGE MEMBER WITH MAGNETIC PROPERTY AND IMAGE FORMING APPARATUS

This invention relates to an electrophotographic image member and control of formation of images on such an image member.

U.S. Pat. No. 5,121,145 shows an electrophotographic apparatus using an endless belt image member. Multicolor toner images are formed on the image member corresponding to electrostatic images created by linear printheads stationed around the image member path. Registration of the images is controlled by sensing the edge of perforations as they pass a CCD associated with each printhead. See also, U.S. Pat. No. 5,040,003 to Willis, Aug. 13, 1991. Other references show similar registration using permanent, optically sensed marks; see, for example, U.S. Pat. No. 5,025,269 to Saeki et al, issued Jun. 18, 1991.

Other references show apparatus in which registration marks are formed for each multicolor image by the apparatus itself. See, for example, U.S. Pat. Nos. 5,200,285 to Carrish, granted Apr. 6, 1993; U.S. Pat. No. 4,912,491 to Hoshino et al, grated Mar. 27, 1990; and U.S. Pat. No. 4,937,664 to Chiku et al, granted Jun. 26, 1990, in which the marks are a simple cross which can be used for both intrack and crosstrack registration. In the latter two references, the registration marks are placed on both edges of a belt for use in skew registration as well.

U.S. Pat. No. 4,829,326 to Emmett et al, granted May 9, 1989, shows apparatus which forms either visible or electrostatic marks on a belt image member for use in image registration.

U.S. Pat. No. 4,556,311, granted to Tagoku Dec. 3, 1985, shows an endless belt photoconductive member having magnetic strips into which are permanently placed magnetic frame marks. The multiple strips allow for different distances between marks for different size images in a seamed belt.

U.S. Pat. No. 2,674,009 to Williams, granted Apr. 6, 1954; and U.S. Pat. No. 4,987,431 to Harvey, granted Jan. 22, 1991; are examples of a large number of references which show the use of magnetic strips on silver halide films for containing magnetic indicia usable by a camera or a printer to control the camera or printer operation.

SUMMARY OF THE INVENTION

It is an object of the invention to improve on prior devices in controlling the formation of images on an image member.

This and other objects are accomplished by a novel image forming apparatus usable with a novel image member.

According to a preferred embodiment, the novel image member is movable through an endless path in the image forming apparatus and has a magnetic portion, for example, a magnetic strip which, when in the apparatus, runs parallel to the endless path.

According to a preferred embodiment, the novel image forming apparatus includes means for supporting such an image member for movement through an endless path. Electronic image writing means is positioned adjacent the path and is responsive to an electrical encoder signal indicative of the position of the image member with respect to the writing means. Magnetic read means is positioned adjacent the path at a predetermined position with respect to the writing means for creating an electrical encoder signal in response to one or more tracks containing a magnetic encoder signal in the strip.

According to a further preferred embodiment, two or more linear printheads are positioned adjacent the path of the image member. An electrical writing signal is created for controlling the first printhead in writing a series of lines on the image member. The same or an associated signal creates a magnetic encoder signal in the strip. Magnetic read means associated with the second printhead reads the magnetic encoder signal in the strip and controls the formation of lines with the second printhead in response to the magnetic encoder signal to register the two images.

The magnetic encoder has the advantage over prior optical encoders of using technology that is extremely well developed and capable of extremely high resolution. For example, a distinct bit of information can be imparted to the magnetic strip and easily read for every line of exposure with an LED printhead operating at a resolution of, for example, 600 lines per inch. Such encoder resolution is difficult to obtain with an optical encoder, especially if formed with conventional electrophotographic apparatus. The magnetic encoder signal can be recorded during operation of the machine or in the factory during manufacture of the image member.

According to a further preferred embodiment, a magnetic read means positioned adjacent the path includes means for reading additional magnetic information in the strip for controlling operation of other portions of the apparatus. This magnetic information can be input in the magnetic strip at the factory and can be indicative of manufactured characteristics of that particular image member. Alternatively, it can be placed in the strip by the apparatus itself in response to signals obtained from other portions of the apparatus. With this preferred embodiment, the magnetic strip not only performs the function of a magnetic encoder for image formation, but also has a memory for storing information usable for controlling the apparatus in general. Many aspects of the apparatus can be controlled using such information. For example, information about maximum charging voltage, dark decay rates, contrast and residual voltage after fully exposing the film can be used to control development electrode bias, charging, exposure, and toner concentration. Additionally, a scanner or densitometer can be used to detect defects in the imaging member, such as electrical breakdown spots, and that portion of the imaging member can be labeled and avoided. Such information can be input in the factory based on the characteristics of this particular image member as affected by manufacturing variables and updated by the apparatus itself in response to densitometer or potentiometer readings or copy count and the like.

DESCRIPTION OF THE PREFERRED EMBODIMENTS

Figure 1:
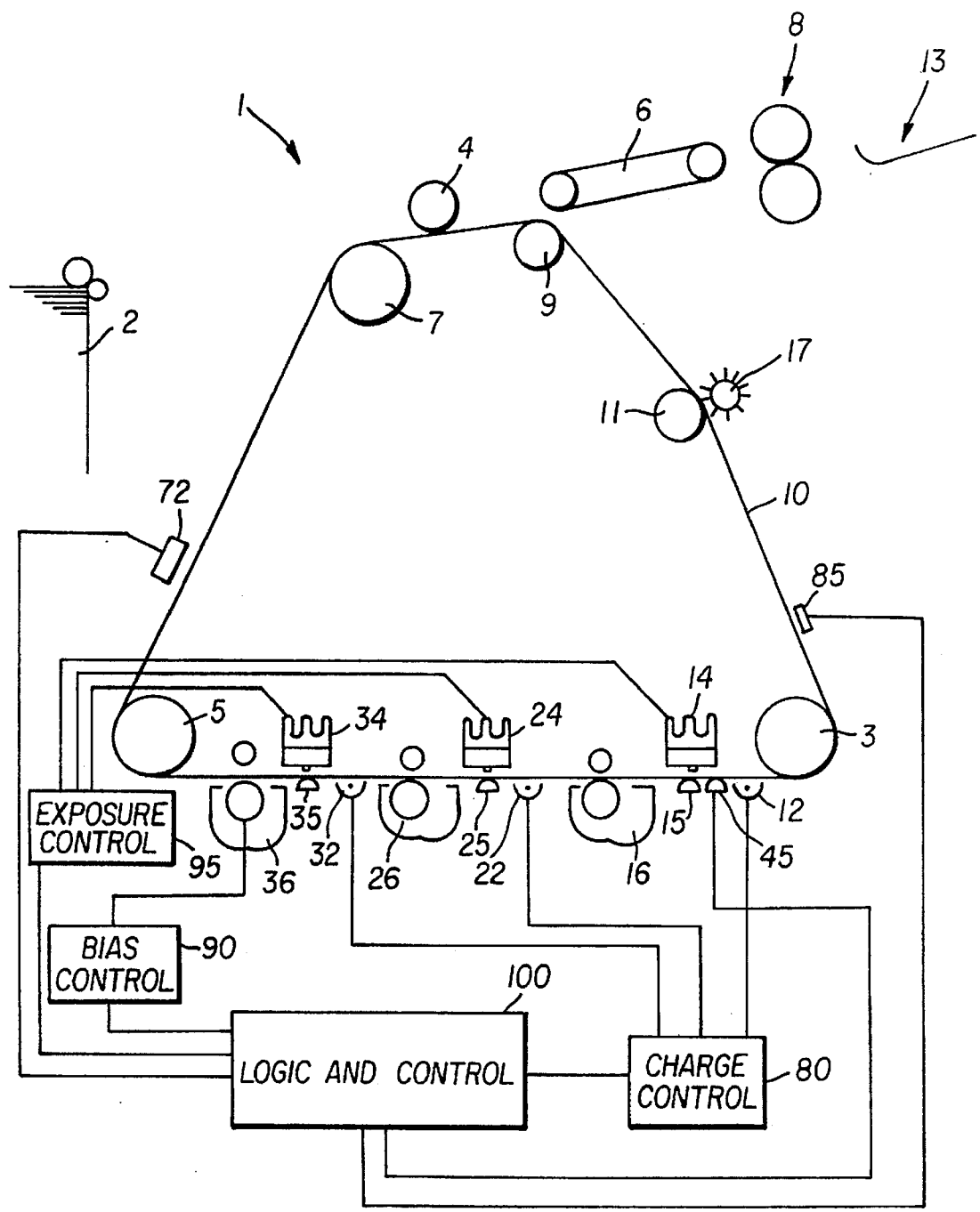
FIG. 1 is a side schematic of an image forming apparatus.

Referring to FIG. 1, an image forming apparatus 1 uses an electrophotographic process for forming a multicolor image, which process is generally known in the art. Image forming apparatus 1 includes an endless belt image member, for example, a photoconductive belt 10 having one or more photoconductive layers, which is trained around a series of rollers 3, 5, 7, 9 and 11 and frictionally driven by roller 5 past a series of electrophotographic stations. In forming multicolor images, the image member 10 is charged by a first charger 12 and imagewise exposed by a first linear writer, for example, first LED printhead 14 to create a first electrostatic image. This image is written after detection of a start of frame signal, for example, by a sensor 85. The signal can be either a magnetic bit detected by a magnetic readhead or a film perforation detected by optical means. The first electrostatic image is toned by a first toning station 16 to create a first toner image of a first color, for example, black.

The image member is then charged again by a second charger 22 and imagewise exposed by a second linear writer, for example, a second LED printhead 24 to create a second electrostatic image in generally the same area or frame of the image member as the first toner image. The second electrostatic image is toned by a second toning station 26 to create a second toner image of a second color, thereby creating a two color, multicolor image on the image member.

This process can be repeated with a third charging station 32, a third LED printhead 34 and a third toning station 36 to form a third color toner image in registration with the first two images, thereby forming a three color multicolor image on image member 10.

The toner image, whether it be one, two or three colors, now proceeds to a transfer station 4 where it is transferred to a receiving sheet fed out of a receiving sheet supply 2. The receiving sheet is separated from the image member as the image member passes around a small roller 9 and is transported by a vacuum transport 6 to a fuser 8 where the image is fixed to the receiving sheet. The receiving sheet with the image ultimately ends up in an output tray 13. The image member 10 is cleaned by a cleaning station 17 for continuous reuse in image forming apparatus 1.

Figure 2:
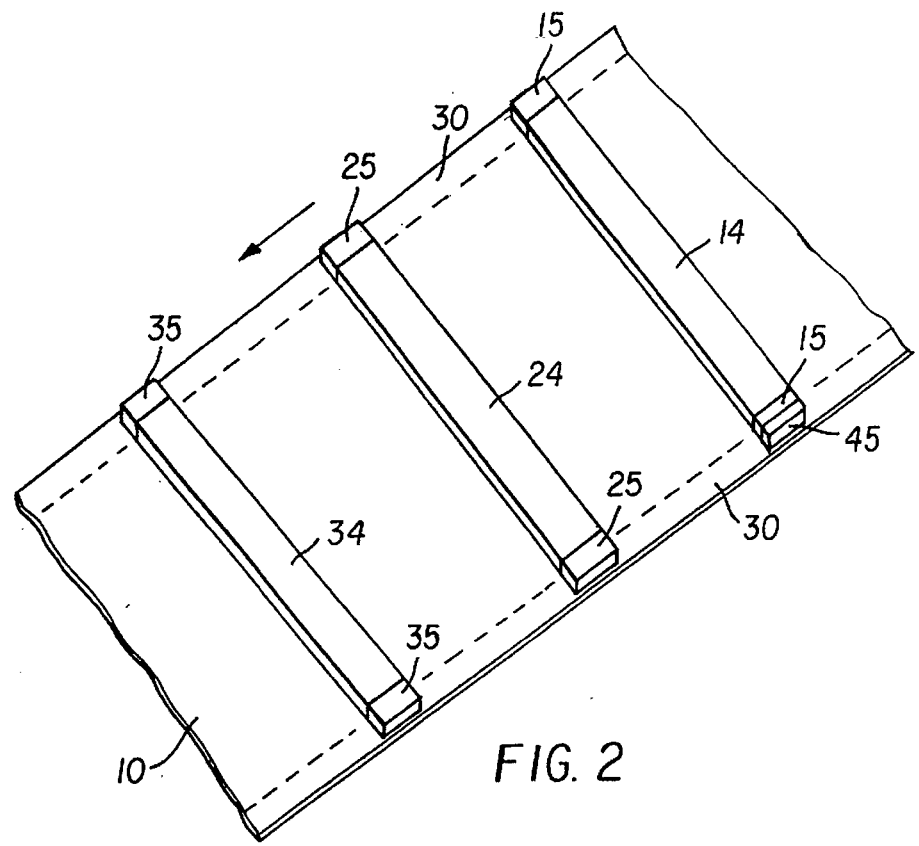
FIG. 2 is a perspective view of three printheads and an image member.
Figure 3:
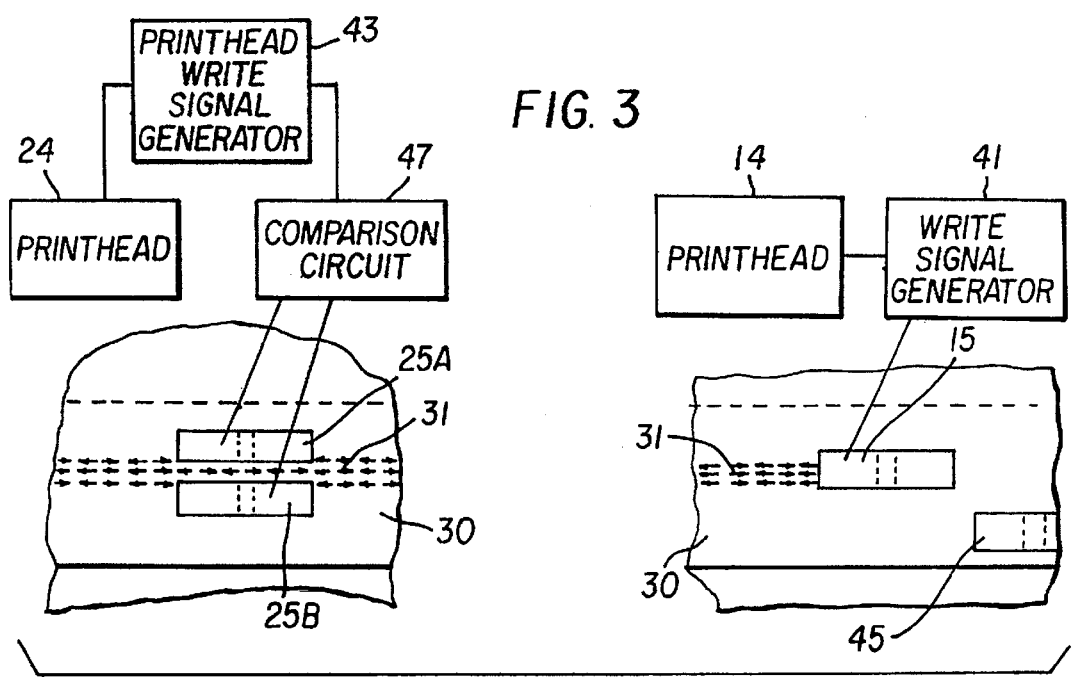
FIG. 3 is a top view with portions cut away of an image member and four magnetic heads.

Registration of the images is determined by the effectiveness of printheads 14, 24 and 34. The quality of this registration very much determines the ultimate quality of the multicolor toner image. This is provided using magnetic heads 15, 25 and 35 which interact with a magnetic strip 30 (FIGS. 2 and 3) positioned on one or both edges of image member 10. Referring to FIG. 3, magnetic head 15 is a magnetic writehead (preferably containing an upstream erase means) positioned adjacent the path of strip 30 and creates a repeating magnetic encoder signal on strip 30 shown schematically at 31. A write signal generator 41 creates an electrical write signal made up of a series of pulses which are fed to printhead 14 to write the first electrostatic image. The rate of these pulses corresponds to the desired intrack resolution of the image and the nominal speed of image member 10. The write signal generator 41 sends an essentially identical signal to magnetic writehead 15 to form a magnetically recorded track containing a magnetic encoder signal 31 having a magnetic bit or bit reversal corresponding to each line written by printhead 14.

As image member 10 moves, the magnetic encoder signal reaches printhead 24. Located adjacent printhead 24 are magnetic readheads 25A and 25B positioned adjacent the path of strip 30 and also separated slightly ha the crosstrack direction. Nominally, the readheads are aligned symmetrically on the edges of the magnetic encoder signal 31 so that each reads an equal width of the encoder signal. The signals produced from reading signal 31 by heads 25A and 25B is fed into a comparison circuit 47 to determine which of the two heads has the strongest signal and then fed to a printhead write signal generator 43 which controls the writing of printhead 24. The printhead write signal generator 43 flashes printhead 24 once as each bit (or transitions between bits) ha signal 31 is read by readheads 25A and 25B. This provides accurate intrack registration of the images.

According to a preferred embodiment, printhead write signal generator 43 also reacts to which of the magnetic readheads 25A or 25B is the stronger to electronically adjust for crosstrack misregistration. Such crosstrack misregistration can occur because of the tracking of image member 10 between printheads 14 and 24. If the signal 31 has moved closer to readhead 25A, that readhead will have a stronger signal which is readable by comparison circuit 47. The line flashed by printhead 24 is moved one or more pixels in a crosstrack direction in response to the output of comparison circuit 47, a scheme well known in the art for curing crosstrack misregistration detected by optical means.

An alternative approach to curing crosstrack misregistration involves moving printhead 24 in a crosstrack direction. In this alternative embodiment, the printhead is mounted on a screw drive or is manually adjustable by a screw in the crosstrack direction. For continuous correction for tracking problems, a servo on the screw moves the head crosstrack until the signals from heads 25A and 25B balance.

Manual adjustment of the printhead in the crosstrack direction is used for setup. More specifically, the relative strength of the signals of heads 25A and 25B is read by a service person who adjusts the crosstrack position of the printhead until they are balanced. Preferably, this setup adjustment can be used in combination with a servo or pixel adjustment during operation. If no continuous crosstrack adjustment is made, then such registration is dependent on belt tracking. For many systems, crosstrack registration is adequate if setup is accurate. Large registration or skew error can be corrected by tilting one or more of rollers 3, 5, 7, 9 or 11. This can be done either automatically or manually. For more sensitive and higher resolution systems, continuous correction can be used.

Although not shown in FIG. 3, the magnetic encoder signal 31 continues on to magnetic readhead 35 associated with printhead 34 shown in FIG. 1 to register the third image with the first two images.

The system shown handles encoding of images once an image exposure is begun. The start of the image can be provided by sensing a frame perf or a frame magnetic signal on another track with either detector 85 or readhead 45. It can also be coded into the encoder signal 31 by writehead 15, providing additional information capable of being sensed by one or both of readheads 25A and 25B, which extra bits of information indicate the beginning of an image. In practice, it may be necessary to mark only the splice of the image member belt.

In the system described, the magnetic encoder signal is erased and rewritten separately for each multicolor image by writehead 15. However, the encoder signal and splice indicator could be stored in the strip permanently in the factory. In this case, the magnetic head 15 would be similar to 25A and 25B.

Note that the printheads 14, 24 and 34 are shown in FIG. 1 on the rear of the image member 10 while the magnetic heads 15, 25 and 35 are shown on the front. As shown in FIG. 2, the magnetic heads can be on the same side as the printheads, which can be on either side of the image member, and can be attached to the ends of the printheads. Note also that there are magnetic strips on both edges of image member 10 in FIG. 2, allowing the formation of an encoder signal at both edges, which encoder signal can be read by its own set of heads and used with the signal from the other side to correct for film tracking and skew errors. More specifically, the phase difference between signals from the edges can be used for skew correction.

Film tracking errors can be corrected by tilting one or more of rollers 3, 5, 7, 9 and 11 until the phase difference between edges is minimized. Printhead skew can also be corrected with manual adjustment screws so that the phase difference between edges is nominally zero. Correcting for film skew and printhead skew independently may be assisted by additional magnetic readheads mounted on the machine frame (not shown).

An auxiliary magnetic head 45 is shown in each of the figures. It can be a readhead or a combination read, erase and writehead. According to one embodiment, magnetic head 45 is a readhead only, which reads magnetic information permanently placed in strip 30 as part of the manufacture of image member 10. This information can identify aspects of variable manufacture which can be compensated for by control of image forming apparatus 1. For example, various photoconductive aspects of image members require different settings on various of the stations. The maximum allowable potential of the photoconductor, the lowest potential the photoconductor can reasonably be discharged to at the process speed, dark decay and contrast are prime examples. These can be compensated for by adjustment of charger grid voltage and current, bias on a development electrode in the toning station, and exposure.

The stored information can be read on cycle-up. The minimum and maximum photoconductor voltages at the developer station and the required developer bias can be estimated using the voltage, development efficiency, and contrast data. After dark decay correction, the exposure can be estimated. After additional dark decay correction, the initial photoconductor voltage and corresponding charger setpoints can be estimated.

With printheads 14, 24 and 34 located behind the belt 1, transparency of the belt is a variable that can be compensated for, preferably, by adjustment of printhead exposure. As seen in FIG. 1, magnetic readhead 45 reads information imparted by the manufacturer which is fed into logic and control 100. Logic and control 100 then controls a bias control 90 and/or a charge control 80 which, in turn control one or all of the development stations and chargers in the apparatus according to the manufactured characteristics of image member 10.

Magnetic strip 30 can also be used to store identification information, for example, identifying the type image member and the manufacturer. This information can be read by head 45 and the operator informed if an improper image member has been inserted. Alternatively, the apparatus can be disabled if an image member not designed for that apparatus is inserted.

Alternatively, or in addition thereto, magnetic head 45 can be both a read and a writehead, also containing erase means. In this embodiment, logic and control 100 is fed various inputs about the process, for example, readings from a densitometer 70 which senses either the toner image or a toner patch created for this purpose to determine how well the process is performing. This information in logic and control 100, in turn is used to control the exposure 95, the bias control 90, and the charge control 80. The information can also be input to the magnetic strip 30 through head 45 and retrieved from the magnetic strip using head 45 in its read mode for future use. This aspect is particularly usable in shutdown and startup cycles of the apparatus. The magnetic strip is particularly convenient to use to store the characteristics of a photoconductor as read, for example, by densitometer 70 during shutdown, which information is then retrieved during startup for the immediate use of logic and control 100 in controlling the apparatus. If a scanner is used to compare the image developed on the photoconductor with the expected image, streaks and/or spots can be detected and the locations on the photoconductor recorded so that those portions of the photoconductor are not used. The condition of image member 10 can also be estimated, for example, by keeping track of its use using a copy counter, and the age or estimated information stored in strip 30. Thus, the magnetic strip 30 functions not only as a means for providing an extremely high quality, high resolution encoder for the creation of multiple images but also as a storage medium for information in controlling the apparatus. The latter information can come both from permanent storage performed at the factory and from day to day storage performed by magnetic head 45.

Magnetic strip 30 can be coated on the edge or edges of image member 10 as part of the original coating process. Such processes are well known for silver halide films having magnetic strips. Alternatively, a strip can be placed there by hand using known magnetic adhesive strips. For example, a high coercivity magnetic tape, such as one manufactured by the 3M Company under the designation 5203 can be used. It has a coercivity of 3600 Oe. Such a high coercivity is desirable to prevent the signal in the strip from being affected by the strong magnets associated with the toning stations in such apparatus.

The silver halide film art also has developed the capability of coating a transparent, full width magnetic layer on a film strip. The magnetic strip in this invention can also be such a layer extending the full width of image member 10. For process information storage or the encoder signal, any crosstrack portion of the layer could be used. For convenience of location of the magnetic heads with respect to the printheads, the edge of the image member is preferred for the encoder signal.

The read and writeheads can be chosen from a large number of such components available commercially, for example, a suitable multigap head for both recording and reading is one marketed by Brash Industries, designated as Model 902219.

It is understood by those skilled in the art that, although the invention preferably provides intrack, crosstrack and skew error correction, the encoder can be used for intrack registration effectively alone without the other features. Either the actual encoder signal or the average frequency of encoder signals with occasional corrections can be used for registration. Also, these signals can be encoded at each line, or periodically every second line, every third line or at other frequencies.

The invention has been described in detail with particular reference to a preferred embodiment thereof, but it will be understood that variations and modifications can be effected within the spirit and scope of the invention as described hereinabove and as defined in the appended claims.

We claim:

1. Image forming apparatus comprising:
   an image member movable through an endless path which image member has a magnetic strip, which can be a full width of the image member or less, running parallel to the endless path and a magnetic encoder signal in the strip,
   means for supporting the image member for movement through the endless path,
   means for writing a series of first lines on the image member to form a first electrostatic image in response to an electrical encoder signal, and magnetic read means positioned adjacent the path and at a predetermined position with respect to the writing means for creating the electrical encoder signal in response to the magnetic encoder signal in the magnetic strip and magnetic write means positioned adjacent the path of the strip for creating a new magnetic encoder signal in the strip passes the magnetic write means; and means responsive to the new magnetic encoder signal for writing a series of second lines on the image member to form a second electrostatic image.

2. Image forming apparatus usable with an image member movable through an endless path, the image member having a magnetic strip, which can be a full width of the image member or less, running parallel to the endless path, said image forming apparatus comprising:

means for supporting the image member and moving it through the endless path, first linear writer positioned adjacent the path for writing a series of lines of image in response to a first electrical write signal, means for creating the first electrical write signal for the first linear writer and a magnetic encoder signal in the magnetic strip corresponding to the first electrical write signal, second linear writer for writing a second series of lines on the image member in response to a second electrical write signal, and means associated with the second linear writer for reading the magnetic encoder signal in the magnetic strip and for creating the second electrical write signal in response thereto.

3. Image forming apparatus according to claim 2, wherein the means for creating the magnetic encoder signal includes a magnetic writehead which creates a readable magnetic bit in the strip for each line written by the first linear writer.

4. Image forming apparatus according to claim 3, wherein the means for reading the magnetic encoder signal includes a magnetic readhead which creates an electrical signal including one pulse for each magnetic bit.

5. Image forming apparatus according to claim 2, wherein the means for creating the magnetic encoder signal includes a magnetic writehead attached to the first linear writer.

6. Image forming apparatus according to claim 2, wherein the means for creating the magnetic encoder signal includes a magnetic writehead positioned adjacent the path of the strip to store the magnetic encoder signal in the strip along a generally straight line parallel to the path as the strip moves past the writehead, and the means for reading the magnetic encoder signal includes means for determining a crosstrack position of the magnetic encoder signal at a location associated with the second linear writer.

7. Image forming apparatus according to claim 6, wherein the means for reading includes a pair of spaced magnetic readheads positioned in opposite sides of a nominal location of the path of the magnetic encoder signal, each of the readheads including means for creating an electrical signal responsive to the magnetic encoder signal which electrical signal varies in strength as the position of the magnetic encoder signal varies in a crosstrack direction, and means for creating an error signal indicative of the position of the encoder signal in response to the electrical signals created by the readheads.

8. Image forming apparatus according to claim 2, wherein the means for supporting an image member includes means for supporting an endless photoconductive belt with a magnetic strip along one edge.

9. Image forming apparatus according to claim 8, wherein the means for supporting an image member includes means for supporting an endless photoconductive belt with magnetic strips along both edges, and wherein said means for creating the magnetic encoder signal includes a magnetic writehead adjacent the path of the belt at each edge of the belt for creating a magnetic encoder signal in each edge of the belt.

10. Image forming apparatus according to claim 2 further including a magnetic readhead located adjacent the path for reading additional information stored in said strip indicative of temporary or permanent characteristics of the image member and means for controlling other components of said image forming apparatus in response to said additional information.

11. Image forming apparatus usable with an endless belt image member movable through an endless path, the image member having a magnetic signal running parallel to the path at a predetermined crosstrack position, said image forming apparatus comprising:

magnetic read means positioned adjacent the path for reading the magnetic signal in the image member and creating an electrical signal in response thereto, and means for creating an error signal indicative of the crosstrack position of the image member in response to the electrical signal.

12. Image forming apparatus according to claim 11, wherein the magnetic read means includes a pair of magnetic readheads positioned to straddle the magnetic signal as it passes.

13. Image forming apparatus according to claim 11 further including a linear writer for writing an image on the image member and means for adjusting the crosstrack position of the image written by the writer in response to the error signal.

14. Image forming apparatus according to claim 11 further including a magnetic writehead positioned adjacent the path for writing the magnetic signal in a magnetic material in the image member.

15. Image forming apparatus for use with an endless belt image member having a photoconductive material for controlling the formation of an image on the image member and a magnetic material in which a signal can be written, said image forming apparatus comprising:

means for supporting the image member and for moving it through an endless path past a series of stations, means for uniformly charging the image member, means for imagewise exposing the image member to create an electrostatic image thereon, means for toning the electrostatic image to create a toner image thereon, means for monitoring performance of the image forming apparatus and writing a magnetic signal in the magnetic material in response to the performance monitored, means for reading the magnetic signal in the image member, and means for controlling at least one of the charging, exposing and toning means in response to the magnetic signal in the magnetic material.

16. Image forming apparatus for use with an endless belt image member having a photoconductive material for controlling the formation of an image on the image member and a magnetic material containing a first magnetic signal indicative of at least one characteristic of the image member and the magnetic material additionally containing a second magnetic signal indicative of an encoder signal, said image forming apparatus comprising:

means for supporting the image member and for moving it through an endless path past a series of stations, means for uniformly charging the image member, means for imagewise exposing the image member to create an electrostatic image thereon, means for toning the electrostatic image to create a toner image thereon, means for reading the encoder signal and for controlling the means for exposing in response to the encoder signal, and means for reading the first magnetic signal indicative of at least one characteristic of the image member and for controlling at least one of the charging, exposing and toning stations in response to the first magnetic signal indicative of at least one characteristic of the image member.

17. Image forming apparatus according to claim 16, wherein the means for exposing is a linear writer for writing an image as a series of crosstrack lines with each line separately exposed in response to reading of an element of the encoder signal.

* * * * *